(12) United States Patent
Stoeger et al.

(10) Patent No.: US 10,587,197 B2
(45) Date of Patent: Mar. 10, 2020

(54) METHOD FOR OPERATING A DC-DC CONVERTER, CONTROL APPARATUS FOR A DC-DC CONVERTER, AND DC-DC CONVERTER

(71) Applicant: CONTINENTAL AUTOMOTIVE GMBH, Hannover (DE)

(72) Inventors: Christian Stoeger, Vienna (AT); Emil Kovatchev, Vienna (AT)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/342,223

(22) PCT Filed: Oct. 5, 2017

(86) PCT No.: PCT/EP2017/075360
§ 371 (c)(1),
(2) Date: Apr. 16, 2019

(87) PCT Pub. No.: WO2018/073015
PCT Pub. Date: Apr. 26, 2018

(65) Prior Publication Data
US 2019/0245441 A1 Aug. 8, 2019

(30) Foreign Application Priority Data
Oct. 17, 2016 (DE) .................. 10 2016 220 204

(51) Int. Cl.
*H02M 3/158* (2006.01)
*H02M 3/156* (2006.01)
(Continued)

(52) U.S. Cl.
CPC ............. *H02M 3/158* (2013.01); *H02M 1/08* (2013.01); *H02M 1/38* (2013.01); *H02M 3/156* (2013.01);
(Continued)

(58) Field of Classification Search
CPC ...... H02M 3/155; H02M 3/156; H02M 3/157; H02M 3/158; H02M 1/1584; H02M 1/08; H02M 1/36; H02M 1/38
See application file for complete search history.

(56) References Cited

U.S. PATENT DOCUMENTS 8,077,490 B1 * 12/2011 Prodic .................. H02M 3/158
323/282
8,981,751 B1 3/2015 Young et al.
(Continued)

OTHER PUBLICATIONS

Vahid Yousefzadeh, et al.; "Sensorless Optimnization of Dead Times in DC-DC Converters With Synchronous Rectifiers"; IEEE Transactions on Power Electron; Jul. 4, 2006; pp. 994-1002; vol. 21, No. 4; IEEE.

*Primary Examiner* — Adolf D Berhane
(74) *Attorney, Agent, or Firm* — Laurence A. Greenberg; Werner H. Stemer; Ralph E. Locher

(57) ABSTRACT

A method for operating a DC-DC voltage converter, which, at an output, adjusts an output variable to a prescribed setpoint value by way of a regulator unit. Depending on an actual value of the output variable, the regulator unit sets a duty cycle of a pulse-width modulation. The regulator unit has an operating parameter for providing the pulse-width modulation. The operating parameter is variable and is changed to a new parameter value by a control apparatus which determines whether, with the unchanged setpoint value and the new parameter value, the regulator unit sets a lower duty cycle for adjusting the output variable than before the setting of the new parameter value. In that case, the new parameter value is retained. Otherwise it is changed back. The operating parameter that is varied by the new parameter value is a period of the pulse-width modulation and/or an edge steepness of switching edges.

9 Claims, 3 Drawing Sheets

(51) Int. Cl.
*H02M 1/08* (2006.01)
*H02M 1/38* (2007.01)
*H02M 1/00* (2006.01)

(52) U.S. Cl.
CPC .. *H02M 2001/0048* (2013.01); *Y02B 70/1491* (2013.01)

(56) References Cited

U.S. PATENT DOCUMENTS

| | | | |
|---|---|---|---|
| 10,148,180 B2* | 12/2018 | Ihs | H02M 3/158 |
| 2005/0219883 A1 | 10/2005 | Maple et al. | |
| 2009/0146630 A1 | 6/2009 | Naka | |
| 2009/0179619 A1 | 7/2009 | Houston | |
| 2010/0102788 A1* | 4/2010 | Kuroyabu | H02M 3/156 |
| | | | 323/282 |
| 2010/0237845 A1* | 9/2010 | Scaldaferri | H02J 7/0052 |
| | | | 323/299 |
| 2013/0140896 A1* | 6/2013 | Tzinker | H02M 3/04 |
| | | | 307/43 |
| 2014/0368174 A1* | 12/2014 | Houston | H02M 3/158 |
| | | | 323/271 |
| 2017/0025961 A1* | 1/2017 | Seeman | H02M 1/08 |
| 2018/0301985 A1* | 10/2018 | Kesarwani | H02M 3/157 |

* cited by examiner

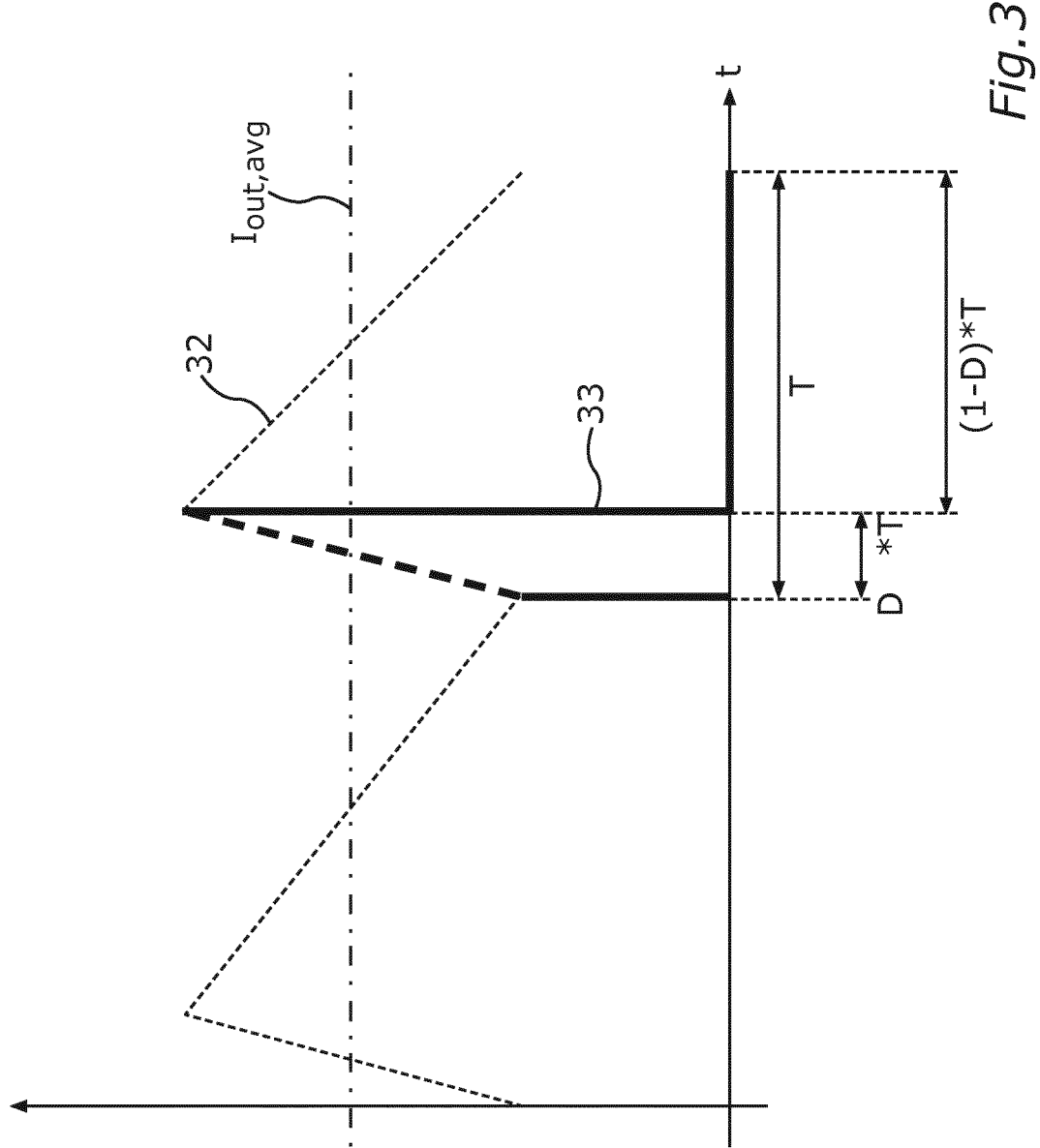

METHOD FOR OPERATING A DC-DC CONVERTER, CONTROL APPARATUS FOR A DC-DC CONVERTER, AND DC-DC CONVERTER

BACKGROUND OF THE INVENTION

Field of the Invention

The invention relates to a method for operating a DC-DC voltage converter in order that the DC-DC voltage converter autonomously configures itself to ensure the most efficient operation possible. The invention also includes a control apparatus for the DC-DC voltage converter in order to carry out the method according to the invention. Finally, the invention also includes a DC-DC voltage converter comprising the control apparatus according to the invention.

A DC-DC voltage converter or DC-DC converter should always have an optimum power efficiency at different operating points, that is to say in the case of different load situations or alternating loads, that is to say should always find the optimum working point given different boundary conditions at the input and at the output.

In US 2009/0179619 A1, the correlation of the efficiency between input voltage, input current, output current and the duty cycle is established in order to find an optimum working point.

It is known from US 2005/0219883 A1 that a DC-DC voltage converter can be configured depending on detected variables by means of a microcontroller in order to set an efficient operation of the DC-DC voltage converter.

SUMMARY OF THE INVENTION

The invention is based on the object of operating a DC-DC voltage converter for different boundary conditions in each case in an optimum manner with respect to energy efficiency.

The object is achieved by means of the subject matter of the independent patent claims. Advantageous developments of the invention are described by the dependent patent claims, the following description and the figures.

One aspect of the invention describes a method for operating a DC-DC voltage converter or DC-DC converter. The DC-DC voltage converter is operated here by means of a pulse-width modulation, that is to say, at an output, an output variable, for example the output voltage, is adjusted to a prescribed setpoint value by means of a regulator unit. The output variable thus constitutes a regulation variable. Depending on an actual value of the output variable, the regulator unit in this case sets a duty cycle of a pulse-width modulated switching signal of a switching transistor of the DC-DC voltage converter on the basis of a regulation specification. A single switching transistor can be provided in the case of a DC-DC voltage converter comprising a rectifying diode. A rectifying diode can also be replaced by a second transistor, as a result of which said synchronous converter is produced. The regulator unit thus adapts the duty cycle in order to adjust the regulation variable. However, the duty cycle is not the only operating parameter or the only characteristic value of the pulse-width modulation. For example, the period or PWM (pulse-width modulation) frequency is a further operating parameter. The regulator unit has at least one such operating parameter for providing the pulse-width modulation, said operating parameter not being used, however, for adjustment but instead being prescribed independently of the actual value of the output variable. In other words, said operating parameter is not used to adjust the output variable.

In order to now configure the operation of the DC-DC voltage converter in an automated manner toward an efficiency optimum, the following is also provided in the method according to the mentioned aspect of the invention. The at least one operating parameter is designed to be variable. In other words, it is not stipulated based on circuit technology but can be set or changed by way of a control apparatus. To this end, the at least one operating parameter is changed to a respective new parameter value by way of the control apparatus, specifically on a trial basis or initially on a temporary basis. The regulator unit then reacts to this in such a way that it further attempts to adjust the setpoint value for the output variable and to this end to adapt the duty cycle according to the regulation specification. Since the boundary conditions have changed, namely the at least one operating parameter, such as the PWM frequency, for example, a new value for the duty cycle can result here. The control apparatus verifies whether, with the unchanged setpoint value and the respective new parameter value, the regulator unit sets a lower duty cycle for adjusting the output variable than before the setting of the respective new parameter value. In this case, that is to say when the duty cycle is decreased by the regulator unit, the respective new parameter value is retained. In the opposite case, that is to say when the regulator unit increases the duty cycle, the respective new parameter value is changed back. That is to say that respective parameter value that was present or set before the setting of the new parameter value is set again.

The control apparatus thus changes the boundary conditions in the form of the at least one operating parameter for the regulator unit on a trial basis. In this case, the regulator unit continues to operate the phase-locked loop thereof according to the regulation specification and sets a duty cycle associated with the at least one operating parameter in order to adjust the setpoint value. The control apparatus in this case changes the at least one parameter value as long as a reduction in the duty cycle is produced as a result. Therefore, the DC-DC voltage converter converges overall toward a minimized duty cycle in the case of a given setpoint value. This corresponds to a maximization of the efficiency of the DC-DC voltage converter, as will generally be derived in the following text in connection with the explanation of the exemplary embodiment.

The control apparatus can therefore vary different operating parameters of the regulator unit in the described manner in order to thereby optimize the operation thereof in the interests of efficiency. As the at least one operating parameter, a period (that is to say the inverse of the PWM frequency) of the pulse-width modulation is altered or changed for a new parameter value. In addition or as an alternative to this, an edge steepness of switching edges can be varied by means of the respective new parameter value.

The invention also includes optional technical features, which each produce an additional advantage.

The optimum working point in the context of power efficiency or efficiency for short is achieved, in particular, by virtue of the fact that the duty cycle is minimized overall through repeated setting of the at least one new parameter value.

As already stated, an output variable is regulated by the regulator unit. In this case, provision is preferably made, in the DC-DC voltage converter, for an input voltage to be received at an input and an output voltage or an output current or an output power as the output variable to be regulated to the setpoint value at the output.

Since the control apparatus is not part of the regulator unit itself but instead influences said regulator unit from the outside by changing the at least one parameter value, the control apparatus must be capable of recognizing the resulting duty cycle that is set by the regulator unit. To this end, provision is preferably made for the duty cycle to be measured by the control apparatus on the basis of a time measurement of switching edges in the output variable. To this end, a direct interconnection of the control apparatus with the regulator unit is then not necessary. The control apparatus can therefore be coupled to the regulator unit retrospectively. As an alternative to this, provision can be made for the duty cycle to be identified by the control apparatus based on the switching signal by means of which at least one switching transistor, or transistor for short, of the DC-DC voltage converter is switched. Said switching signal can be applied or generated, for example, at a gate of the transistor. This produces the advantage that the measurement of the duty cycle is not distorted, for example, by a capacitive or inductive load connected downstream of the DC-DC voltage converter. A third alternative consists in the control apparatus digitally detecting the duty cycle directly from the regulator unit by virtue of a digital data value, which the regulator unit has identified by means of a processor device, being received from the regulator unit. In this case, it is the theoretical required duty cycle that is involved, that is to say a duty cycle not distorted by impedances of lines. Therefore, three measurement options are thus available for identifying the real duty cycle, namely a time measurement, a measurement of an integrated signal in the form, for example, of a gate signal, and a calculated value of the required duty cycle.

The control apparatus varies different operating parameters of the regulator unit in the described manner in order to thereby optimize the operation thereof in the interests of efficiency. In addition to the mentioned operating parameters, that is to say the period of the pulse-width modulation and/or the edge steepness of switching edges, a dead time between transistors that are switched synchronously in phase opposition can be set by means of a parameter value.

When a change in the duty cycle is verified, it should be ensured that the regulator unit is currently in a steady state, that is to say the duty cycle does not change even on account of a change, for example, in the setpoint value or the output variable or the connected electrical load. In particular, provision can be made here for the at least one operating parameter to be first or only changed by the control apparatus if the control apparatus detects that a deviation of the actual value from the setpoint value satisfies a predetermined steady-state criterion. The steady-state criterion can indicate, for example, that the magnitude of a difference between the actual value and the setpoint value must be lower than a predetermined threshold value. In addition or as an alternative to this, the steady-state criterion can make provision, for example, for the deviation to have to fluctuate by less than a predetermined tolerance value for a predetermined minimum period of time. In other words, the deviation of the regulation variable or output variable from the setpoint value thereof must thus be low (lower in magnitude than the threshold value). Furthermore, the regulator unit should be in a steady state, that is to say the deviation should be lower than the tolerance value for the minimum period of time. That is to say, when the at least one new parameter value is set, the regulator unit itself is therefore in a steady-state phase or a steady state, that is to say outside of an adjustment phase. It can therefore be assumed that a change in the duty cycle can be attributed to the change in the at least one parameter value.

In order to carry out the method according to the aforementioned aspect of the invention, a further aspect of the invention provides a control apparatus for a DC-DC voltage converter. The control apparatus can be realized, for example, on the basis of a microcontroller or as part of an integrated circuit (IC) or by way of a computation unit. The control apparatus is designed to identify a duty cycle that has been set by a regulator unit of the DC-DC voltage converter. Furthermore, the control apparatus is designed to adjust at least one operating parameter of the regulator unit, that is to say to reset or to change a respective parameter value of the at least one operating parameter. Furthermore, the control apparatus is designed to carry out an embodiment of the method according to the invention.

According to a further aspect of the invention, the DC-DC voltage converter is produced by combining the control apparatus with a DC-DC voltage converter. Said DC-DC voltage converter has an electrical coil and a regulator unit for adjusting an output variable at an output of the DC-DC voltage converter. The adjustment takes place by switching the coil current of the electrical coil by means of at least one switching transistor on the basis of a pulse-width modulation in the described manner. The regulator unit is in this case coupled to an embodiment of the control apparatus according to the invention. As a result, the regulator unit and hence the DC-DC voltage converter is configured overall to form an optimum in the interests of power efficiency through the operation of the control apparatus.

The DC-DC voltage converter can be provided, for example, in a motor vehicle.

BRIEF DESCRIPTION OF THE SEVERAL VIEWS OF THE DRAWING

An exemplary embodiment of the invention is described below. In this regard, in the figures:

FIG. 3 shows a graph with a schematized temporal profile of a coil current of a step-down rectification.

DESCRIPTION OF THE INVENTION

The exemplary embodiment explained below is a preferred embodiment of the invention. In the exemplary embodiment, the described components of the embodiment each represent individual features of the invention which are to be considered independently of one another and which each also develop the invention independently of one another and can therefore also be considered to be a component of the invention, either individually or in a combination other than that shown. Furthermore, further features of the invention that have already been described can also be added to the described embodiment.

In the figures, functionally identical elements are each provided with the same reference symbols.

Figure 1:
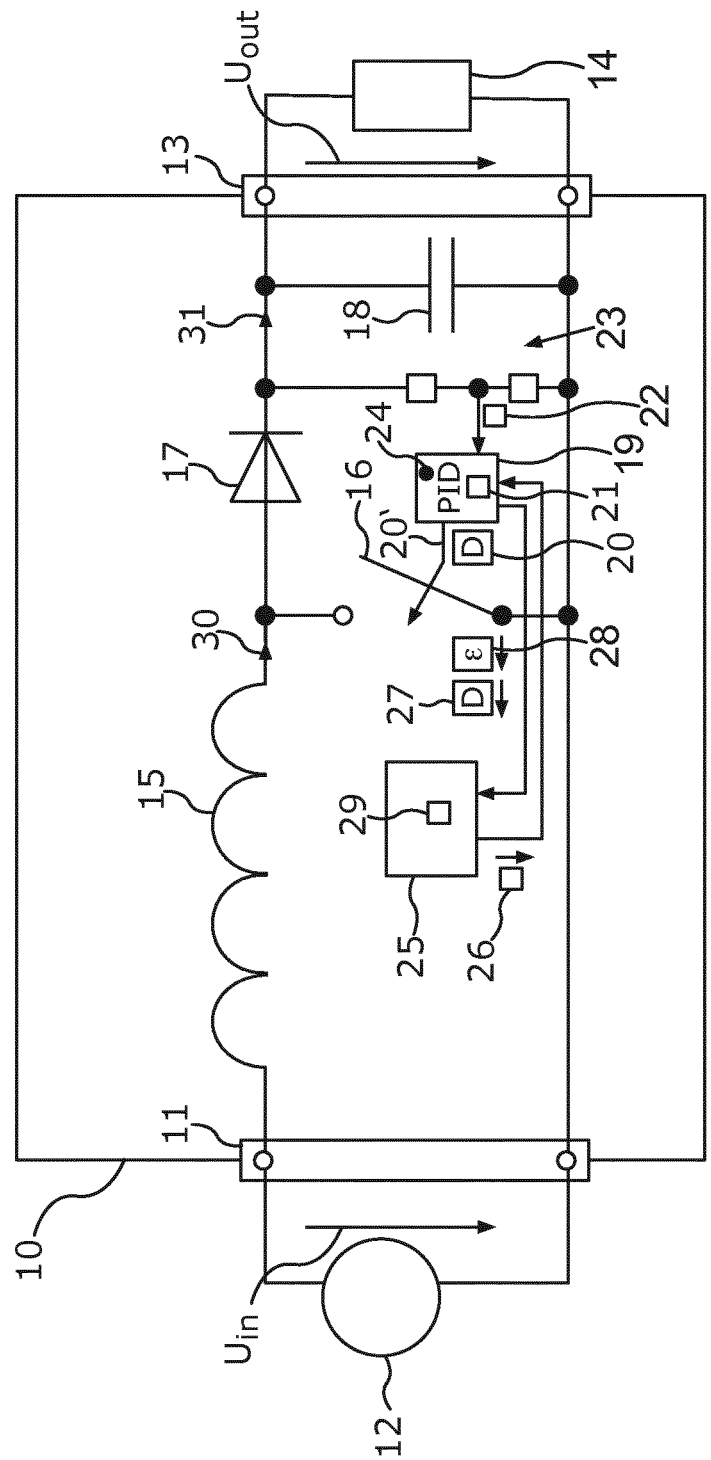
FIG. 1 shows a schematic illustration of an embodiment of the DC-DC voltage converter according to the invention.

FIG. 1 shows a DC-DC converter or DC-DC voltage converter 10, which can receive, at an input 11, an input voltage $U_{in}$ from a voltage source 12 and, at an output 13, can generate an output voltage $U_{out}$ for an electrical load 14. The voltage source 12 may be, for example, a battery or a switched-mode power supply. The electrical load 14 may be, for example, a control device or a DC motor. FIG. 1 illustrates a step-up converter or boost converter. In the exemplary embodiment shown, the DC-DC voltage converter 10 has an electrical coil 15, a switch in the form of a switching transistor, or transistor for short, 16 and a rectifying diode 17. Instead of the rectifying diode 17, a further switch in the form of a transistor can be provided for a synchronous converter. In addition, a smoothing capacitor 18 can be provided at the output 13. Owing to the coil 15, an electrical contact of the input 11 is interconnected with a contact of the transistor 16 and a contact of the diode 17 or of the second transistor. Owing to the transistor 16, the coil 15 and the diode 17 are interconnected with a second electrical contact of the input 11 and of the output 13. Owing to the diode 17, the coil 15 and the transistor 16 are interconnected with a first electrical contact of the output 13. The smoothing capacitor 18 interconnects or capacitively couples the two electrical contacts of the output 13.

The transistor 16 can be switched by a regulator unit 19 by means of a pulse-width modulation 20 of a switching signal 20 2 0 ~ at the gate of the transistor 16. In this case, the regulator unit 19 can set a duty cycle, which is also referred to as a mark-to-space ratio D, depending on a value of the output voltage $U_{out}$ in order to adjust the output voltage $U_{out}$ to a setpoint value 21 as a result. An actual value 22 of the output voltage $U_{out}$ can be detected by the regulator unit 19 by means of a voltage measurement device 23, for example a voltage divider. The regulator unit 19 can set the duty cycle D of the pulse-width modulation 20 depending on the actual value 22 and the setpoint value 21 by means of a regulation specification 24, for example a PID (proportional integral differential) regulation.

In order to optimize a power efficiency η of the DC-DC voltage converter 10 here, a control apparatus 25 can be provided, for example as a constituent part of an IC, by way of which the regulator unit 19 can also be provided.

Owing to the control apparatus 25, at least one parameter value 26 for an operating parameter of the regulator unit 19, which parameter value is provided to adjust or provide the pulse-width modulation 20, can be changed or set and as a result the power efficiency η can be optimized. In this case, the control apparatus 25 recognizes iteratively an improvement in the power efficiency based on a data value 27 of the duty cycle D, which the control apparatus 25 can receive from the regulator unit 19. The at least one parameter value 26 can be changed depending on a steady state of the regulator unit 19, when, for example, a regulation deviation 28 (ε) satisfies a predetermined steady-state criterion 29, for example is lower in magnitude than a predetermined threshold value.

Said optimization of the power efficiency η results from the following observation of the input variables and output variables of the DC-DC voltage converter, by way of which the input variables and output variables do not provide any additional information about whether a working point or operating point of the DC-DC voltage converter 10, that is to say the present parameter values 26, are ideal or not. The following calculation exists for the efficiency η:

For the step-up converter (boost converter):

$$\eta_{boost} = \frac{P_{out}}{P_{in}} = \frac{U_{out}}{U_{in}} \cdot \frac{I_{out,avg}}{I_{in,avg}} = \frac{1}{1 - D_{ideal}} \cdot \frac{I_{out,avg}}{I_{in,avg}}$$

and for the step-down converter (buck converter):

$$\eta_{buck} = \frac{P_{out}}{P_{in}} = \frac{U_{out}}{U_{in}} \cdot \frac{I_{out,avg}}{I_{in,avg}} = D_{ideal} \cdot \frac{I_{out,avg}}{I_{in,avg}}$$

In this case, $P_{in}$ is the total electrical power drawn and $P_{out}$ is the output power that is output. In this case, it is assumed that the input voltage $U_{in}$ is provided and the output voltage $U_{out}$ is regulated by the regulator unit 19.

Figure 2:
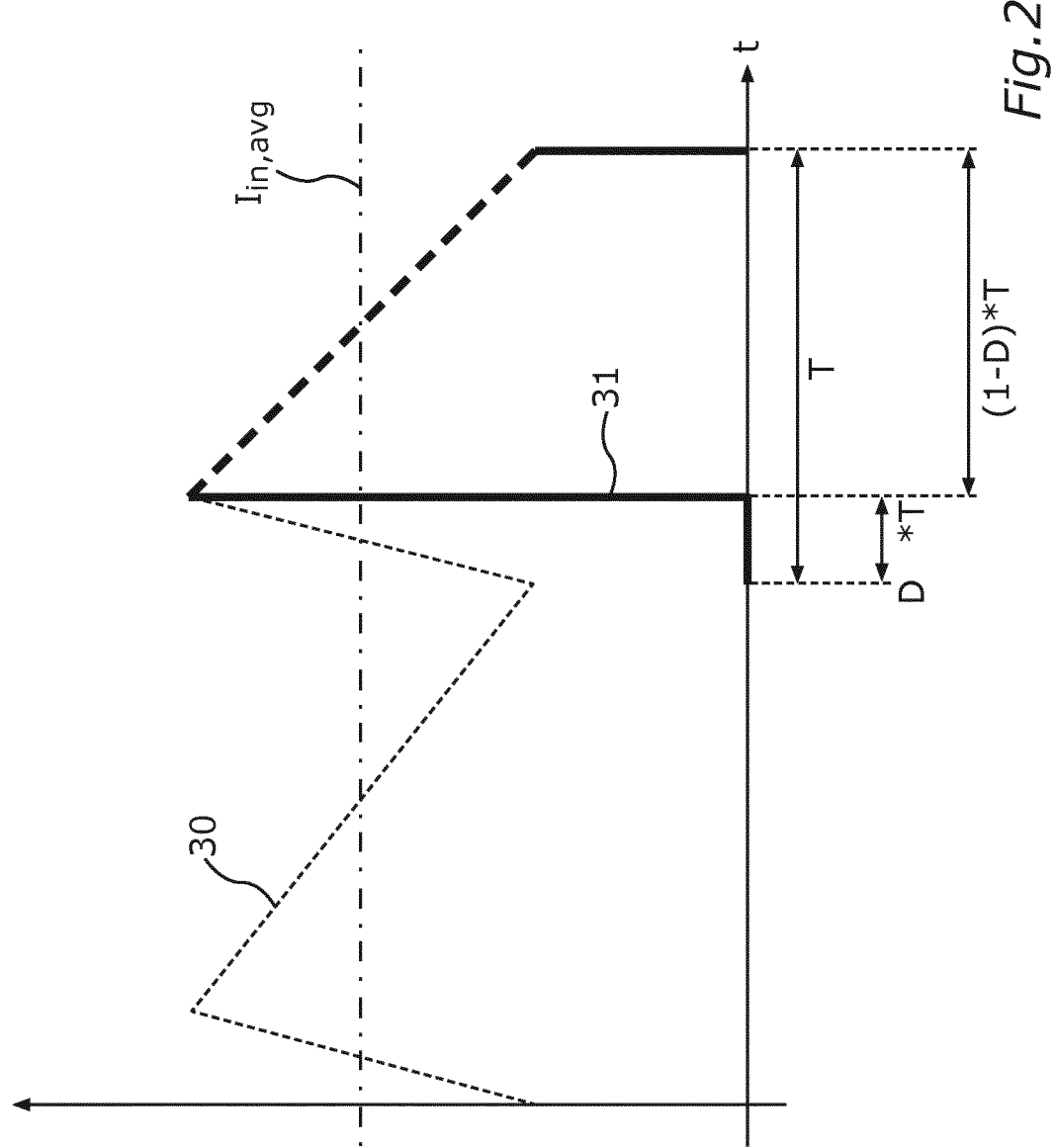
FIG. 2 shows a graph with a schematized profile of a coil current of a step-up rectification over time t.

If one now considers the current profiles in the converter inductance, that is to say the coil 15, and notes that a current that flows into a node must also flow out of said node again according to Kirchhoff's law, the following correlations for the average values of the currents are obtained, wherein in FIG. 1 and FIG. 2 the illustration for the step-up converter (boost converter) is provided for the coil current 30, the output current 31, the average input current $I_{in,av}$ and the average output current $I_{out,avg}$:

for the step-up converter:

$$I_{out,avg} = I_{in,avg} \cdot (1 - D)$$
$$\frac{I_{out,avg}}{I_{in,avg}} = 1 - D$$

and for the step-down converter:

$$I_{in,avg} = I_{out,avg} \cdot D$$
$$\frac{I_{out,avg}}{I_{in,avg}} = \frac{1}{D}$$

FIG. 2 furthermore illustrates the period T, that is to say the inverse of the PWM frequency f=1/T and the real duty cycle D.

FIG. 3 illustrates in a comparable manner the average output current $I_{out,avg}$ for a coil current 32 and an input current 33 of a step-down converter (buck converter).

If one now substitutes the equations into one another respectively, the following is obtained for the power efficiency η:

$$\eta_{boost} = \frac{1 - D}{1 - D_{ideal}}$$
$$\eta_{buck} = \frac{D_{ideal}}{D}$$

For both results, it holds true that if η is intended to be greater, the real duty cycle D has to be lower. In this respect, it is no longer important which powers are present at the input 11 and at the output 13. Only the minimum of the real duty cycle D has to be found. This means that the control apparatus 25 only has to carry out a method that optimizes the efficiency η of the DC-DC voltage converter 10 without explicitly paying attention to this value of the efficiency η or also detecting only one variable that would make it possible to calculate the efficiency η.

The control apparatus 25 must thus identify only the real duty cycle D of the DC-DC voltage converter 10 and vary at least one operating parameter by changing the parameter value 26 thereof in order to find a minimum of the real duty cycle D as a result. If an overall minimum of the duty cycle D in the case of a given setpoint value 21 and given load in the form of the load 14 and given input voltage $U_{in}$ is found, the set parameter values 26 describe the optimum working point in the case of a prescribed supply condition and load condition.

The real duty cycle D can be identified through time measurement or by means of a measurement of an integrated signal, for example of the actuating signal or switching signal 20 2 0 for the gate of the transistor 16. FIG. 1 illustrates an embodiment in which the duty cycle D is used as a digital value 27, that is to say the indication of the required duty cycle identified by the regulator unit 19.

A variable operating parameter is generally one that is relevant for the efficiency η of the DC-DC voltage converter 10. This is, in particular, the PWM frequency f, and it may additionally also be a dead time for the embodiment with transistors of the synchronous converter that switch synchronously in phase opposition. In addition or as an alternative, the edge steepness of the switchover processes can also play a role here, wherein the electromagnetic compatibility (EMC) is also influenced here, which should be taken into account. Through simple trials, it is possible to determine which of the mentioned operating parameters for a given model of a DC-DC voltage converter 10 most effectively leads to optimization of the efficiency η.

In the DC-DC voltage converter 10, the regulator unit 19 can regulate the output voltage $U_{out}$ in the described manner.

However, regulation of an output current 31 and/or of the output power $P_{out}$ at the output 13 can also be provided.

In the manner mentioned, the control apparatus 25 can be part of an IC, which control apparatus also contains the regulator unit 19. However, a combination of a separate computation unit with software or as switching logic and a regulator unit 19 separate therefrom can also be provided. The condition is only that the DC-DC voltage converter 10 provides information about the duty cycle D to the control apparatus 25 in a suitable manner, that is to say in an analog or digital manner. The control apparatus 25 then has the option to set or to influence the parameter values 26 and to identify the reaction of the regulator unit in the form of a changed value of the duty cycle D.

It is advantageous here when the identification of the real duty cycle D or the use of the data value 27 with the required duty cycle D only occurs if the magnitude of the deviation 28 of the regulation variable (output voltage in the case of a voltage converter with voltage as the output variable, output current in the case of a voltage converter with current as the output variable or output power in the case of a voltage converter with power as the output variable) from the setpoint value 21 is lower than a threshold value, that is to say is very low. In particular, the deviation should be lower than 20%, preferably lower than 10%.

Overall, the example shows how the invention can provide efficiency adaptation for DC-DC voltage converters (DC-DC converters) without measuring the input and output power.

LIST OF REFERENCE SIGNS

10 DC-DC voltage converter
11 Input
12 Voltage source
13 Output
14 Electrical load
15 Electrical coil
16 Transistor
17 Rectifying diode
18 Smoothing capacitor
19 Regulator unit
20 Pulse-width modulation
21 Setpoint value
22 Actual value
23 Voltage measurement unit
24 Regulator specification
25 Control apparatus
26 Parameter value
27 Data value
28 Regulator deviation
29 Steady-state criterion
30 Coil current
31 Output current
32 Coil current
33 Input current
D Duty cycle, sampling rate
T Period
t Time
$U_{in}$ Input voltage
$U_{out}$ Output voltage

The invention claimed is:

1. A method of operating a DC-DC voltage converter, the DC-DC voltage converter having a regulator unit for adjusting an output variable at an output to a prescribed setpoint value, the method comprising:
   depending on an actual value of the output variable, setting with the regulator unit a duty cycle of a pulse-width modulation of a switching signal for at least one switching transistor of the DC-DC voltage converter according to a predetermined control specification, the regulator unit having at least one operating parameter for providing the pulse-width modulation, and the operating parameter being prescribed to the regulator unit independently of the actual value, and the at least one operating parameter being a variable operating parameter;
   changing the at least one operating parameter to a respective new parameter value by way of a control apparatus, and subsequently verifying the new parameter value to determine whether, with the setpoint value unchanged and the respective new parameter value, the regulator unit sets a lower duty cycle for adjusting the output variable than before a setting of the respective new parameter value;
   if the regulator unit sets the lower duty cycle, retaining the respective new parameter value or, if the regulator unit does not set a lower duty cycle, changing back the parameter value; and
   wherein, as the at least one operating parameter, an edge steepness of switching edges is varied by way of the respective new parameter value.

2. The method according to claim 1, which comprises minimizing the duty cycle by repeatedly setting at least one new parameter value.

3. The method according to claim 1, wherein an input of the DC-DC voltage converter receives an input voltage and the method comprises regulating an output voltage or an output current or an output power as the output variable to the setpoint value at the output.

4. The method according to claim 1, which comprises identifying the duty cycle by the control apparatus on a basis of a time measurement of switching edges in the output variable or based on a switching signal switching the at least one transistor, or receiving the duty cycle as a digital data value, which is identified by a processor device of the regulator unit and indicates a required duty cycle.

5. The method according to claim 1, which comprises varying a dead time between transistors that are switched synchronously in phase opposition as the at least one operating parameter by way of the respective new parameter value.

6. The method according to claim 1, which comprises only changing the at least one operating parameter by the control apparatus if the control apparatus detects that a deviation of the actual value from the setpoint value satisfies a predetermined steady-state criterion.

7. The method according to claim 6, wherein the steady-state criterion comprises a magnitude of the deviation being lower than a predetermined threshold value and/or the deviation fluctuating by less than a predetermined tolerance value for a predetermined minimum period of time.

8. A control apparatus for a DC-DC voltage converter, the control apparatus being configured to identify a duty cycle set by a regulator unit of the DC-DC voltage converter and to adjust at least one operating parameter of the regulator unit, and the control apparatus being configured to carry out the method according to claim 1.

9. A DC-DC voltage converter, comprising:
 an electrical coil and comprising a regulator unit for adjusting an output variable at an output of the DC-DC voltage converter by means of at least one switching transistor on the basis of a pulse-width modulation, wherein the regulator unit is coupled to a control apparatus according to claim 8.

* * * * *